United States Patent [19]

Thomanek

[11] 4,267,582

[45] May 12, 1981

[54] CIRCUIT ARRANGEMENT FOR STORING A TEXT

[75] Inventor: Gerd Thomanek, Munich, Fed. Rep. of Germany

[73] Assignee: Siemens Aktiengesellschaft, Berlin & Munich, Fed. Rep. of Germany

[21] Appl. No.: 925,276

[22] Filed: Jul. 17, 1978

[30] Foreign Application Priority Data

Oct. 31, 1977 [DE] Fed. Rep. of Germany ....... 2748859

[51] Int. Cl.³ .............................................. G06F 7/06
[52] U.S. Cl. ................................................... 364/900
[58] Field of Search ... 364/900 MS File, 200 MS File

[56] References Cited

U.S. PATENT DOCUMENTS

| 3,132,324 | 5/1964 | Estrems | 364/900 |
| 3,685,020 | 8/1972 | Meade | 364/200 |
| 3,729,712 | 4/1973 | Glassman | 364/900 |

*Primary Examiner*—Mark E. Nusbaum
*Assistant Examiner*—David Y. Eng
*Attorney, Agent, or Firm*—Hill, Van Santen, Steadman, Chiara & Simpson

[57] ABSTRACT

A circuit arrangement for storing a text of characters and of combination characters composed of a plurality of characters has the characters assigned code words which can be input into a working memory. The working memory contains a text memory in which the code words of the characters, and possibly the code words of a character of the combination of characters of a given portion of a text, can be stored in the form of primary groups and in which, where applicable, the other characters of the combination characters can be stored by hierarchically classified subsidiary groups. The working memory contains an assignment memory for storing items of assignment data which are associated with the primary groups and the subsidiary groups and which indicate the position and number of the character positions of each primary group and of the subsidiary groups.

5 Claims, 2 Drawing Figures

CIRCUIT ARRANGEMENT FOR STORING A TEXT

BACKGROUND OF THE INVENTION

1. Field of the Invention

This invention relates to a circuit arrangement for storing a text wherein the text consists of characters and of combination characters formed from a plurality of characters and wherein the characters are assigned code words which can be stored in a working memory.

2. Description of the Prior Art

In the processing of texts employing text processing devices it is necessary to store the text in a working memory. Each character of a text is assigned a code word with which the character is coded.

It is conceivable to store the code words in the working memory in accordance with the sequence in which the characters are input. If, however, a text contains combination characters which are composed from a plurality of characters, these combination characters are stored in different manners within the memory depending on the sequence in which they are input. Combination characters of this kind consist, for example, of underlined characters or characters which are provided with an accent. If, during text processing, the text stored in the working memory is to be searched in accordance with a search word provided with a combination character, the search word must be input in the same manner as the text stored in the working memory. If, however, the manner in which the text was input into the working memory is not known, frequently it is impossible to search the stored text in accordance with the search word.

It is also conceivable to provide each possible character position of the text with a number of storage cells in the working memory, which number is equal to the maximum number of characters which form a combination character. For example, each character position can be allocated four storage cells within the working memory. However, this type of measure requires a large working memory capacity and it is highly probable that many storage cells will remain unused since generally only a relatively small number of combination characters occur.

SUMMARY OF THE INVENTION

It is therefore the object of the invention to provide a circuit arrangement for storing a text containing combination characters, with the aid of which arrangement the characters and combination characters of the text are stored in the working memory in the same manner irrespectively of the sequence in which they are input and wherein the working memory requires only a small expense.

According to the present invention, the foregoing object is realized in a circuit arrangement of the type generally described above in that the working memory contains a text memory in which the code words of the characters, and possibly the code words of a character of the combination characters of a given portion of the text, can be stored in the form of primary groups and possibly the other characters of the combination characters can be stored by hierarchically classified subsidiary groups, and that the working memory contains an assignment memory in which assignment data can be stored, the assignment data being related to the primary groups and the subsidiary groups and which indicate the position and number of the character positions in each primary group and each subsidiary group.

A circuit arrangement constructed in accordance with the present invention has the advantage that a clear assignment is achieved between the characters stored in the working memory and the characters which can be represented on a page of print or on a screen. This allows subsequent corrections in the text to be carried out in a simple manner. The characters of the search words can also be input in an arbitrary sequence as it is always ensured that the characters are stored in the same manner in the working memory independently of the sequence in which they are input.

An advantageous division of the text into primary groups, and possibly associated subsidiary groups, is achieved in that those portions which possess identical characteristics and which have a maximum length of one line are in each case assembled to form primary groups, and possibly associated subsidiary groups. Identical characteristics consist, for example, of representation in normal script, in italics, or representation in regions which cannot be overwritten.

The code words of characters which form combination characters can be input into those cells of the working memory provided for the primary groups or subsidiary groups in a simple manner by providing a comparator which is supplied with the code words to be input and which, depending upon a given criterion, inputs the code words into cells within the working memory which are assigned to the primary group or to a subsidiary group, and/or which exchanges the code words already stored in the cells of the primary group or of a subsidiary group with code words stored in the particular lower subsidiary group.

The code words of the characters can be distributed into a primary group or a subsidiary group in a particularly simple manner if the comparator employs the value of the sequence of binary characters of the code words considered as a dual number by way of given criteria.

Different characteristics of the text, such as for example protected regions or representation in italics or normal script, are characterized in a simple manner if the assignment data contains data words which indicate the properties of the characters of the relevant primary group or subsidiary group.

A particularly simple structure of the circuit arrangement is achieved if the text memory and the assignment memory form portions of one single working memory.

A working memory which contains the text memory and the assignment memory is operated in a simple manner if the working memory is connected to a first address register which inputs the primary groups and the secondary groups with an ascending order of addresses and is connected to a second address register which inputs the assignment data with a descending order of addresses.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
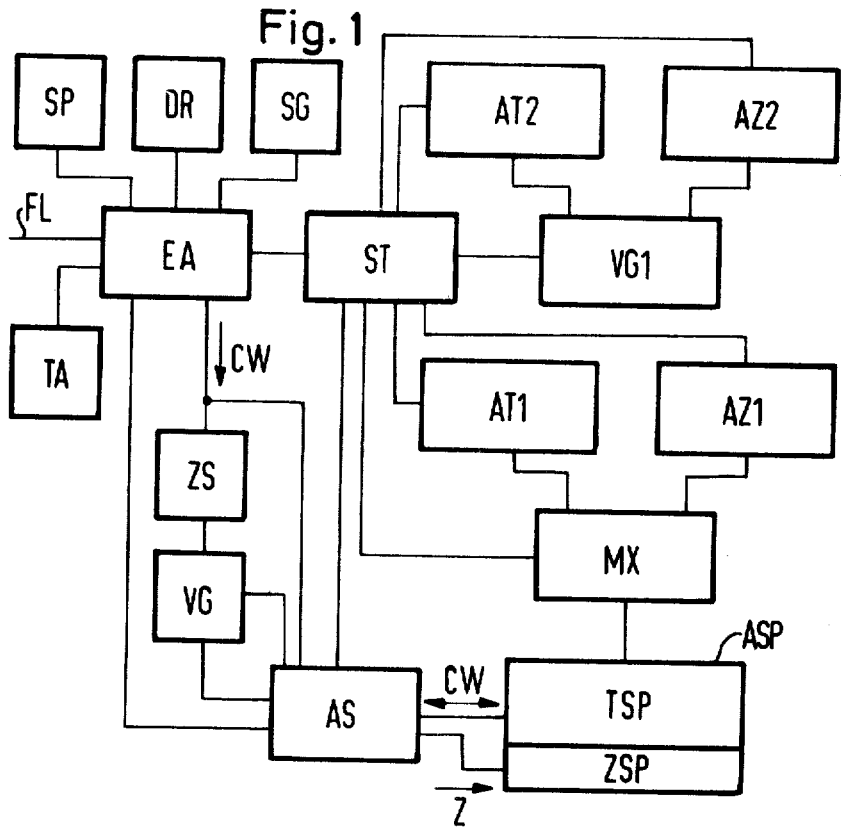
FIG. 1 is a block circuit diagram representation of an arrangement constructed in accordance with the present invention.

Referring to the circuit arrangement illustrated in FIG. 1, characters of a text are input via a keyboard TA, a trunk line FL or a memory SP by means of an input/output unit EA. The text can be printed out with the aid of a printer DR or represented on a screen of a viewing device SG. The circuit arrangement contains a working memory ASP which stores the text, for example for text processing purposes. The characters of the text are stored by means of code words which are assigned to the characters and which are coded, for example, in accordance with CCITT Code No. 5. The working memory ASP comprises a text memory TSP which stores the characters of the text and further contains an assignment memory ZSP in which assignment data are stored. The assignment data indicates the position, the length and the characteristics of the characters stored within the text memory TSP.

The characters are stored in the text memory TSP in the form of groups. The length of a group is, for example, that of one line or that of characters having identical characteristics within a line. If a group does not contain any combination characters formed from a plurality of characters, the characters are stored in the text memory TSP in accordance with the sequence in which they are input. Assignment data is simultaneously produced in the assignment memory ZSP. If the characters stored in the text memory TSP represent one line, the position of the line within the item of print or upon the screen of the viewing device SG is stored by means of the assignment data. Furthermore, the number of character positions in the line and the characteristics of the characters are stored.

If, however, the line contains combination characters, the characters in this line are stored in primary groups and subsidiary groups. For example, characters are stored in one primary group and up to three subsidiary groups when a combination character composed of four characters can occupy a storage position. Appropriate items of assignment data are produced for each primary group and each subsidiary group and are stored in the assignment memory ZSP.

Further details of the circuit arrangement of FIG. 1 will be described below together with the input, illustrated in FIG. 2, of a given text into the working memory ASP.

Figure 2:
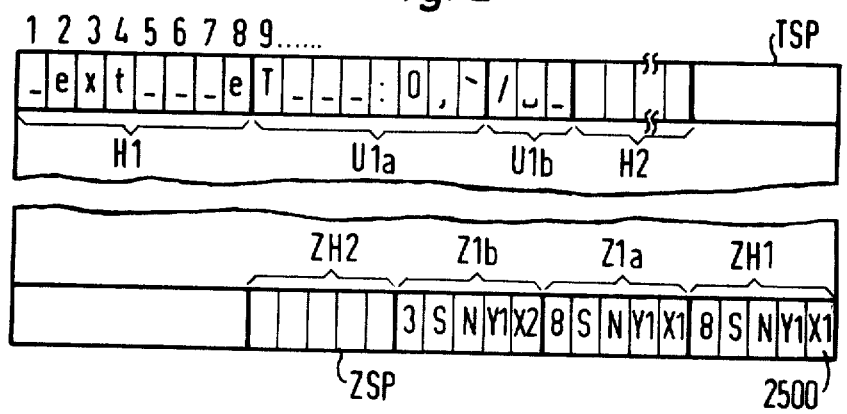
FIG. 2 is an illustration of characters and items of assignment data stored in the working memory during the storage of a given text.

The representation, illustrated in FIG. 2, of the working memory ASP which comprises the text memory TSP and the assignment memory ZSP will be based on the assumption that one line of the text contains the following characters: text: φ, è. This sequence of characters is to be stored in the working memory ASP. For reasons of clarity, however, the corresponding characters have been represented in FIG. 2 in place of code words.

It will be assumed that the above characters are input in the following sequence. First of all, the characters "text: O, e" are input. Then the resetting key is operated three times and the characters "/" and " ` " are input. Finally, the resetting key is operated eight times and then the "underline" character is input eight times.

When the character T is to be input with the aid of the keyboard TA, the trunk line FL or the memory SP, the input/output unit EA produces a code word CW which is fed to an intermediate memory ZS and to an exchange stage AS. By way of the exchange stage AS, the code word CW is input into the text memory TSP. At the same time, the exchange stage AS feeds the assignment memory ZSP with code words X1 and Y1 which serve as an assignment character Z and which indicate the abscissae and ordinates of the line to be printed relative to a reference point. Here, the left-hand upper corner of a page serves, for example, as the reference point. The fact that this is a representation of normal script is also input into the assignment memory ZSP by means of a character N. A control character S can also be input which indicates whether this is a protected text which cannot be overwritten. The exchange stage AS contains a counter which counts the number of input characters in each group and emits a corresponding data word to the assignment memory ZSP if the text memory TSP and the assignment memory ZSP are accommodated in one single working memory ASP, it is advantageous to input the characters of the text with ascending addresses and to input the assignment characters with descending addresses. The character "T" is to be input, for example, into the first storage cell of the text memory TSP, whereas the corresponding items of assignment data are input into the last cells of the assignment memory ZSP.

When the character "T" is input, the input/output unit EA emits a signal to a control unit ST which sets two address registers AT1 and AT2 to the value 1 and sets two further address registers AZ1 and AZ2 to the value 2500 which corresponds to the highest address in the working memory ASP. Furthermore, the control unit ST emits a signal to a multiplexer MX which switches through the contents of the address register AT1 to the address input of the working memory ASP. Therefore, the character "T" is input into the first cell of the text memory TSP. Then, the other characters of the line "ext: O, e" are entered into the storage cells 2 to 8, stepping on the address registers AT1 and AT2.

If the resetting key is then actuated in order to input the characters "/ ⊔ ` ", the group is considered closed and remains as a primary group H1 in the first eight storage cells of the text memory TSP. Then, the control unit ST emits a signal to the multiplexer MX in order to switch through the contents of the address register AZ1 to the working memory ASP in order to store the items of the status data ZH1 assigned to the primary group H1 in the highest positions of the working memory ASP. The control unit ST, on the one hand, emits signals to the exchange stage AS in order to transmit the individual status characters consecutively to the working memory ASP and, on the other hand, emits signals to the address register AZ1 which reduce the contents thereof in accordance with the emitted status characters Z. When the five status characters ZH1 have been emitted from the exchange stage AS, the address stored in the address register AZ1 has also been reduced by five. The contents of the address register AZ2 is also reduced by five by signals emitted from the control unit ST.

Prior to the input of the characters "/ ⊔ ` ", the resetting key is operated three times. The contents of the address register AT1 is now reduced by three units, whereas the contents of the address register AT2 remains unchanged. By way of the next character, the character "/" is input which forms part of the combination character φ. As this character constitutes a combination character, a first subsidiary group U1a is opened.

This combination character is the sixth character of the text and the first five storage cells of the subsidiary group U1a are therefore filled with the character "⊔". When the character "/" is input, a comparator VG checks whether this character has a higher priority than the character "O" at the corresponding position in the primary group H1. For this purpose, each input character is first stored in the intermediate memory ZS and compared by means of the comparator VG with the character, read via the exchange stage AS, at the corresponding position. The decision as to whether the input character has a higher priority is carried out on the basis of whether the sequence of binary characters, considered as a dual number, of the code words coded in accordance with the CCITT Code No. 5 is greater. The character "O" has the binary character sequence 0110000, whereas the character "/" has the binary character sequence 0101111. As the character "O" has the higher priority, this remains stored in the primary group H1, wheras the character "/" is stored in the subsidiary group U1a. The subsequent input characters "⊔" and " ` " are checked in a similar manner and input into the two last cells of the subsidiary group U1a. Then, under the control of the address register AZ1, the items of assignment data Z1a are input into the assignment memory ZSP. The items of assignment data Z1a are identical to the items of assignment data ZH1 as the characters are printed out in the same character positions and the number of characters is also equal.

If the resetting key is then operated eight times in order to input the "underlined" symbol, a further subsidiary group U1b is opened in the text memory TSP. The contents of the address register AT1 is reduced by eight, whereas the contents of the address register AT2 is identical to the address of the last cell associated with the subsidiary group U1a. When the first character "_" is input, the comparator VG again checks whether this character has a higher priority than the character "T" or the character "⊔" in the primary group H1 and in the subsidiary group U1a. As the character "_" has the highest priority, this is input into the first cell of the primary group H1. The character "T" is stored in the first cell of the subsidiary group U1a and the character "⊔" originally contained therein is input into the first cell of the subsidiary group U1b. Similarly, the other characters in the primary group H1 and in the subsidiary group U1a are compared with the "_" characters. Then, due to the exchange of the characters, the characters illustrated in FIG. 2 are stored in the primary group H1 and in the subsidiary group U1a. The subsidiary group U1b first contains five characters "⊔" and then a character "/", a further character "⊔" and a character "_". If a new line is printed following the input characters and a "new line" key is actuated, the items of assignment data Z1b associated with the subsidiary group U1b are produced. In order to save storage space within the text memory TSP, the first five characters "⊔" are not stored so that only the characters illustrated in FIG. 2 are stored in the subsidiary group U1b. The absence of the characters "⊔" is indicated by the fact that in the assignment data Z1b the value of X2 is increased by the corresponding number of characters "⊔" and the number of character positions in the assignment data Z1b is only input as three.

The following line of the text is input into the primary group H2 in a similar manner to that in which the text has been input into the primary group H1. Here, it has been assumed that this text contains no combination characters and thus no subsidiary groups are required. The primary group H2 is allocated assignment data ZH2 similarly to the primary group H1. If the lines commence exactly below one another, the X-values are in each case equal to the value X1 of the assignment data ZH1, and the Y-values are each greater by a given unit assigned to the line spacing.

The lowest address of the assignment data is in each case stored in the address register AZ2, whereas the highest address of the characters in the text memory TSP is stored in the address register AT2. The comparator VG1 in each case compares whether sufficient spacing exists between these addresses to prevent that part of the working memory assigned to the text memory TSP from being overwritten by the assignment data, and vice-versa, to prevent that part of the working memory ASP assigned to the assignment data from being overwritten by the characters of the text.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for storing a text which comprises characters and combination characters composed of a plurality of characters, the characters being assigned code words, the arrangement comprising:

memory means including a text memory for storing in primary group code words of individual first characters and of second characters which are portions of combination characters, and for storing in hierarchically classified subsidiary groups code words of third characters which are portions of combination characters, and an assignment memory for storing assignment data associated with the respective primary and subsidiary groups and which indicate the position and number of character positions of each primary and subsidiary group; and control means for generating assignment code connected to said memory means for inputting the code words and the assignment data into said text and assignment memories, said control means comprising code word generating means, and a comparator connected between said code word generating means and said text memory for comparing in accordance with predetermined criteria, code words to be input and code words already stored, and which is operable in response to the comparison in a first time to store the input code words and in a second time to exchange code words already stored in primary and subsidiary groups with code words stored in the particular next lower subsidiary group, said comparator comprising means for comparing the code words in accordance with the values of the sequence of their binary characters considered as binary numbers as the predetermined criteria.

2. The circuit arrangement of claim 1, comprising:

means for determining and assembling those portions of a text which have identical characteristics and a maximum length of one line of text into primary groups and associated subsidiary groups.

3. The circuit arrangement of claim 1, wherein said control means comprises:
  exchange means for generating the assignment data to include characteristics of the relevant primary and subsidiary groups.

4. The circuit arrangement of claim 1, wherein said memory means comprise:
  a working memory which includes both said text memory and said assignment memory.

5. The circuit arrangement of claim 4, wherein said control means comprises:
  a first address register connected to said working memory and operable to input code words in the primary and subsidiary groups with an ascending order of addresses; and
  a second address register connected to said working memory and operable to input the assignment data with a descending order of addresses.

* * * * *